ns***

United States Patent
Li

(10) Patent No.: US 10,250,803 B2
(45) Date of Patent: Apr. 2, 2019

(54) VIDEO GENERATING SYSTEM AND METHOD THEREOF

(71) Applicant: HTC Corporation, Taoyuan (TW)

(72) Inventor: Kuan-Wei Li, Taoyuan (TW)

(73) Assignee: HTC Corporation, Taoyuan (TW)

( * ) Notice: Subject to any disclaimer, the term of this patent is extended or adjusted under 35 U.S.C. 154(b) by 682 days.

(21) Appl. No.: 14/833,130

(22) Filed: Aug. 23, 2015

(65) Prior Publication Data

US 2017/0054904 A1 Feb. 23, 2017

(51) Int. Cl.
*H04N 5/232* (2006.01)
*G06K 9/00* (2006.01)

(52) U.S. Cl.
CPC ..... *H04N 5/23238* (2013.01); *G06K 9/00255* (2013.01); *H04N 5/23219* (2013.01)

(58) Field of Classification Search
None
See application file for complete search history.

(56) References Cited

U.S. PATENT DOCUMENTS

| 9,374,554 | B1* | 6/2016 | Poulad | H04N 5/23238 |
| 2004/0263636 | A1* | 12/2004 | Cutler | H04N 7/15 |
| | | | | 348/211.12 |
| 2013/0033566 | A1 | 2/2013 | Sento | |
| 2013/0141523 | A1* | 6/2013 | Banta | H04N 5/23238 |
| | | | | 348/36 |
| 2016/0050349 | A1* | 2/2016 | Vance | H04N 5/2259 |
| | | | | 348/36 |

FOREIGN PATENT DOCUMENTS

| JP | 2012068380 A | 4/2012 |
| TW | 201030631 A | 8/2010 |

\* cited by examiner

*Primary Examiner* — James M Anderson, II
(74) *Attorney, Agent, or Firm* — CKC & Partners Co., LLC

(57) ABSTRACT

A video generating system includes: a storage device, a camera device, and a processor. The camera device obtains a 360-degree panoramic video. The processor determines a plurality of meaningful angles of the 360-degree panoramic video, separates the 360-degree panoramic video into a plurality of durations according to the meaningful angles, and generates a normal video according to the durations associated with the meaningful angles. Each duration corresponds to one of the meaningful angles.

16 Claims, 8 Drawing Sheets

VIDEO GENERATING SYSTEM AND METHOD THEREOF

BACKGROUND

Field of Invention

The present invention relates to a video generating system and method thereof. More particularly, the present invention relates to a video generating system of panoramic video and method thereof.

Description of Related Art

In recently years, electronic devices such as mobile phones, digital cameras or tablet computers are usually equipped with lenses for allowing the users to capture photographs or videos. Some electronic devices with the camera functions can use for recording a panorama video, and some electronic devices further can record a 360-degree panoramic video. The 360-degree panoramic video is a video-based real reproduction technology, which uses real video footage to get a three-dimensional video. The viewer can click freely to choose any viewing angle of 360-degree panoramic video that they want to focus, like a person viewing in a real environment.

Further, to view a 360-degree panoramic video needs a particular video player. However, not all electronic devices have a particular video player for viewing the 360-degree panoramic video. Therefore, how to easily transmit or display the 360-degree panoramic video on different kinds of electronic devices becomes a problem to be solved.

SUMMARY

One aspect of the present disclosure is related to a video generating system. In accordance with one embodiment of the present disclosure, the video generating system includes: a storage device, a camera device, and a processor. The processor is operatively configured to determine a plurality of meaningful angles of the 360-degree panoramic video, separate the 360-degree panoramic video into a plurality of durations according to the meaningful angles, and generate a normal video according to the durations associated with the meaningful angles. Each duration corresponds to one of the meaningful angles.

Another aspect of the present disclosure is related to a video generating method for a video generating method. The method includes: determining a plurality of meaningful angles of the 360-degree panoramic video; separating the 360-degree panoramic video into a plurality of durations according to the meaningful angles, generating a normal video according to the durations associated with meaningful angles. Each duration corresponds to one of the meaningful angles.

Through utilizing one embodiment described above, producing a normal video from a 360-degree panoramic video can let anyone have a good viewing experience of the video. The electronic device will capture meaningful viewing angles from different durations and compose a completed normal video for displaying or transmitting between different kinds of electronic devices.

DETAILED DESCRIPTION

It will be understood that, in the description herein and throughout the claims that follow, the phrase "and/or" includes any and all combinations of one or more of the associated listed items.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

Figure 1:
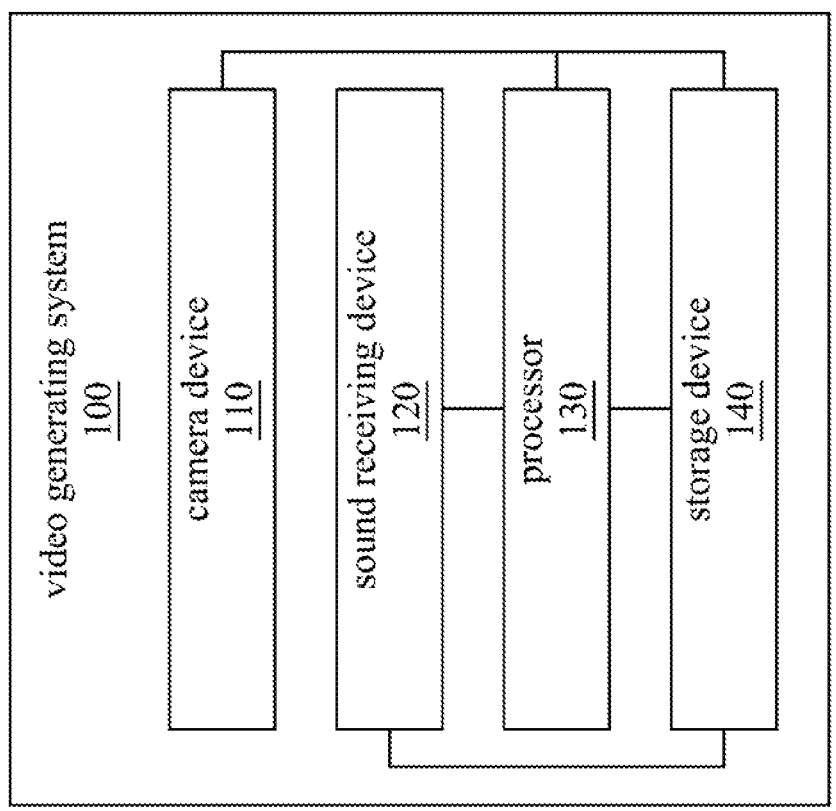
FIG. 1 is a schematic diagram of a video generating system according to one embodiment of the present invention.

Reference is made to FIG. 1 FIG. 1 is a schematic diagram of a video generating system 100 according to one embodiment of the present invention. In this embodiment the video generating system 100 includes a camera device 110, a processor 130, and a storage device 140.

The video generating system 100 can be any kinds of electronic devices, e.g. a mobile device, a laptop computer, a panel device or other systems. The camera device 110 is coupled to the processor 130 and storage device 140. The camera device 110 is used for capturing images or videos. The camera device 110 is implemented by a digital camera or other devices. The camera device 110 provides the function for the users to capture photographs or videos. In one embodiment, the camera device 110 selectively includes multiple lenses and/or wide-angle lenses for capturing images of different directions to obtain a 360-degree panoramic video. The processor 130 is implemented by a microchip, a central processing unit (CPU) or a firmware circuitry. The storage device 140 is used for storing information. The storage device 110 is implemented by a memory, a disk, a storage media, or a memory card, etc., which is used for storing information. In other embodiment, the storage device 110 even can be replaced by a remote connection device.

In another embodiment, the video generating system 100 can further include a sound receiving device 120. The processor 130 and the storage device 140 are coupled to the sound receiving device 120. In one embodiment, the sound receiving device 120 includes one or more microphone for receiving sounds from different directions to record 360-degree panoramic sound with the 360-degree panoramic video.

Figure 2A:
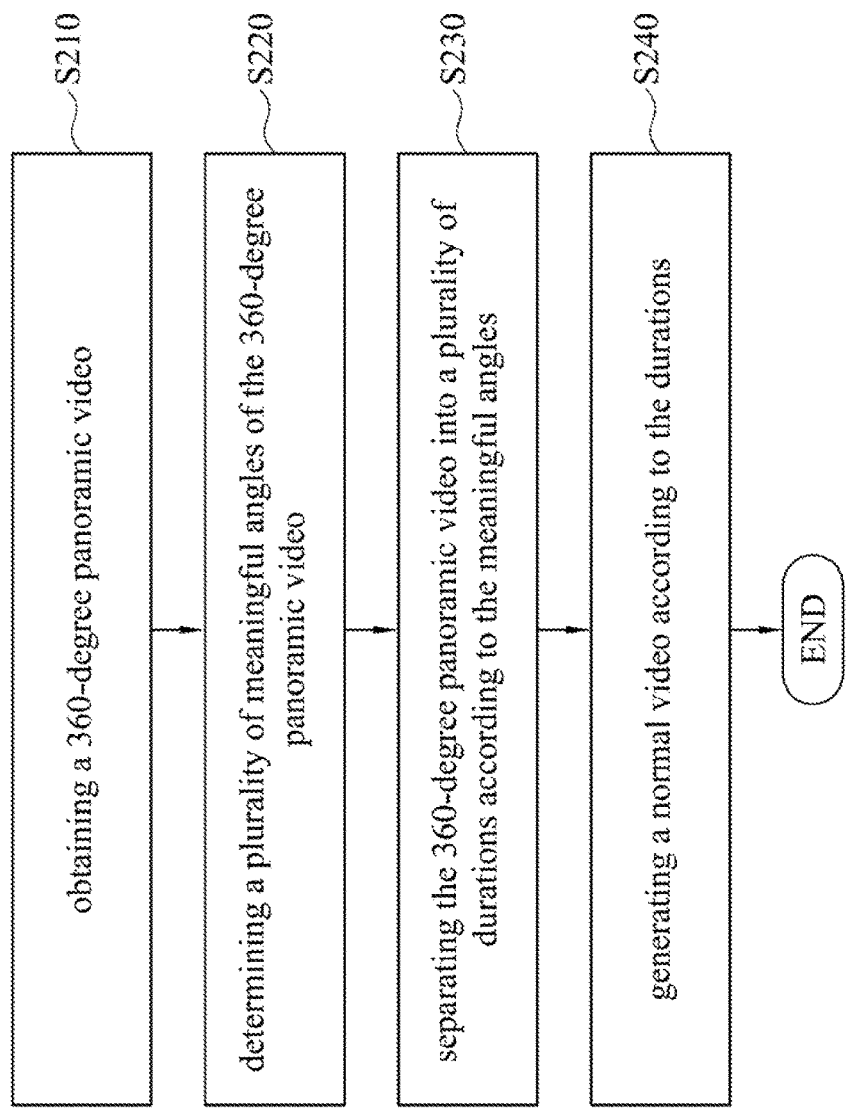
FIG. 2A-2B is a flowchart of a video generating method according to one embodiment of the present invention.
Figure 2B:
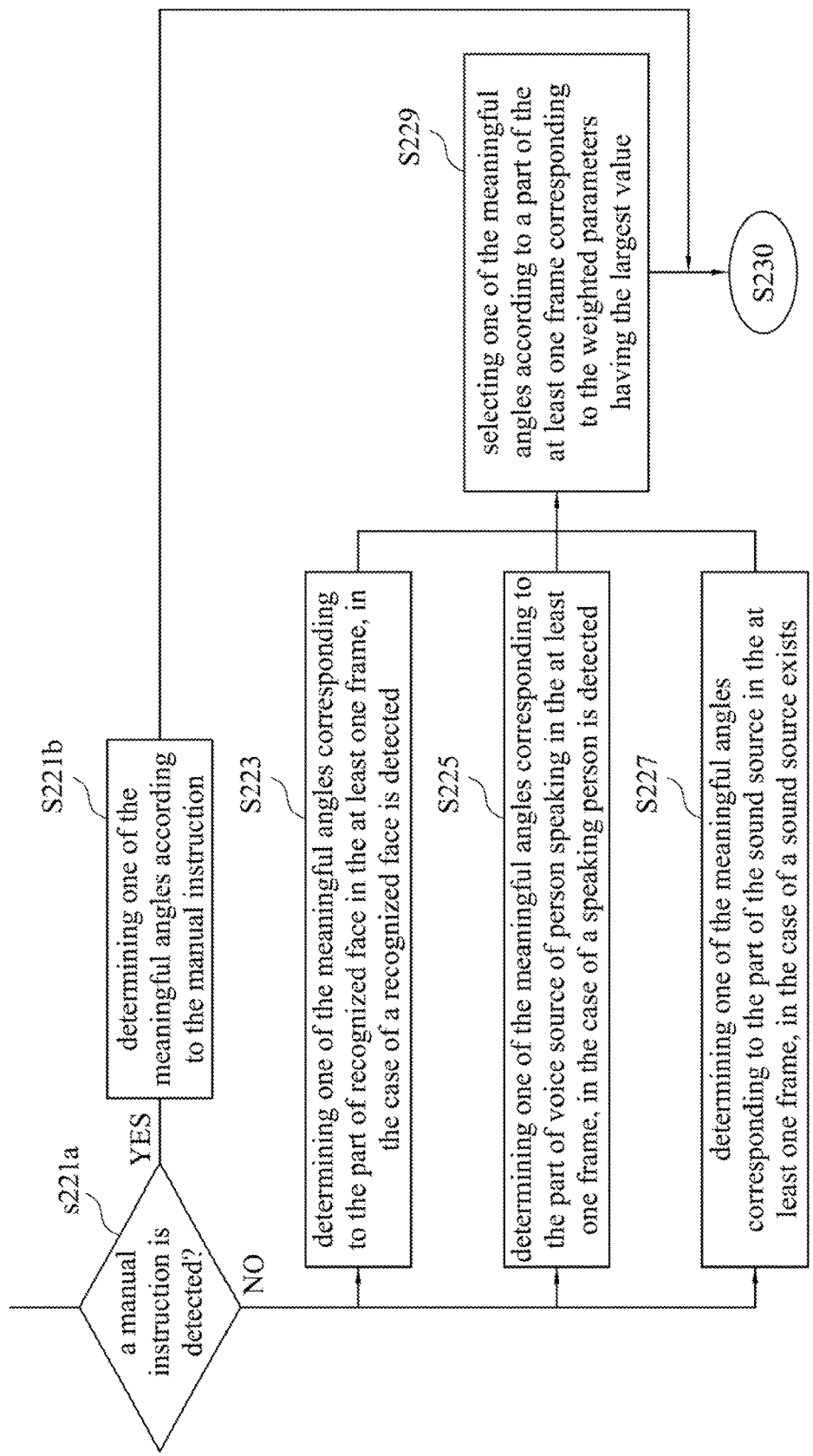
Figure 3:
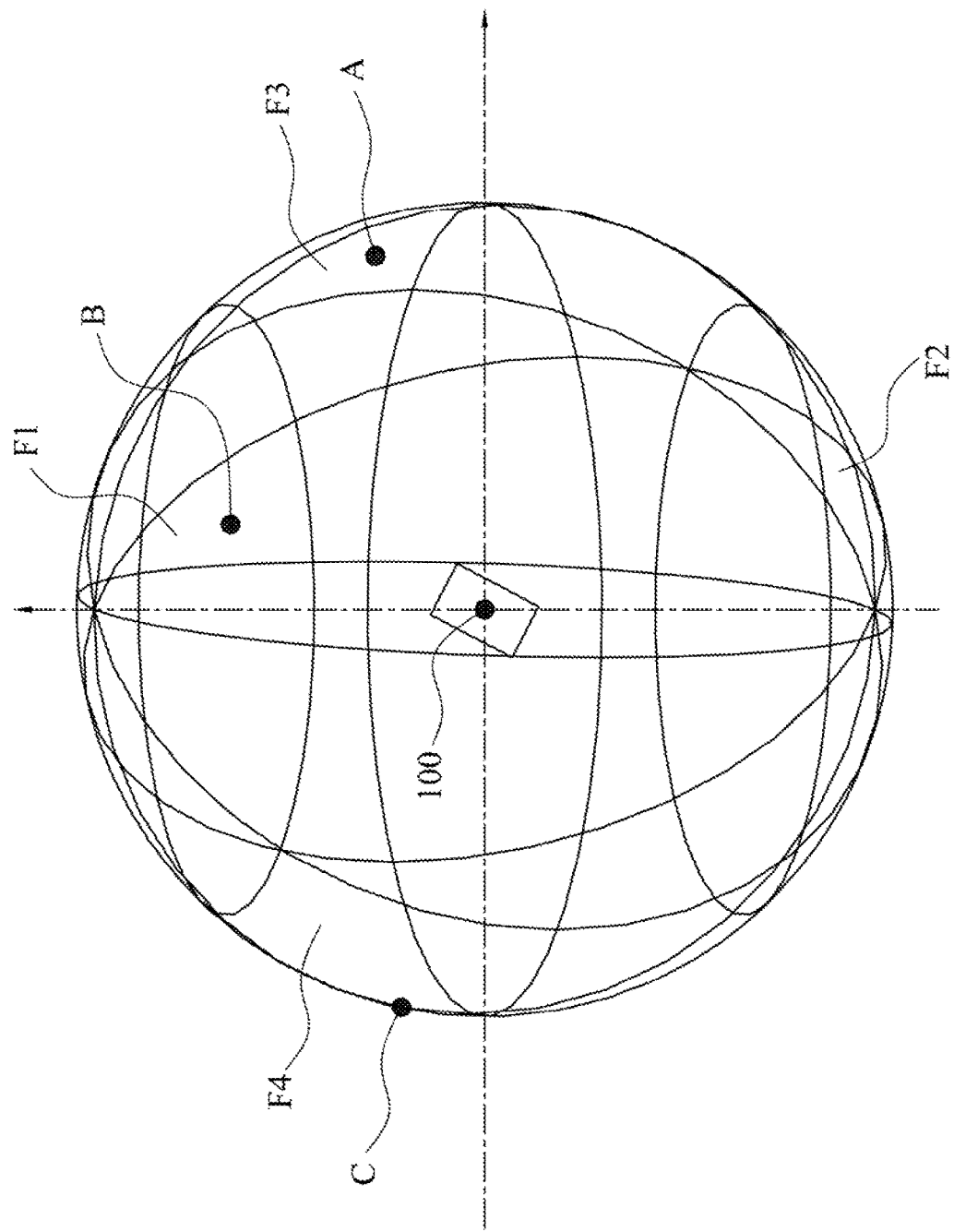
FIG. 3 is a schematic diagram of a video generating method according to one embodiment of the present invention.
Figure 4:
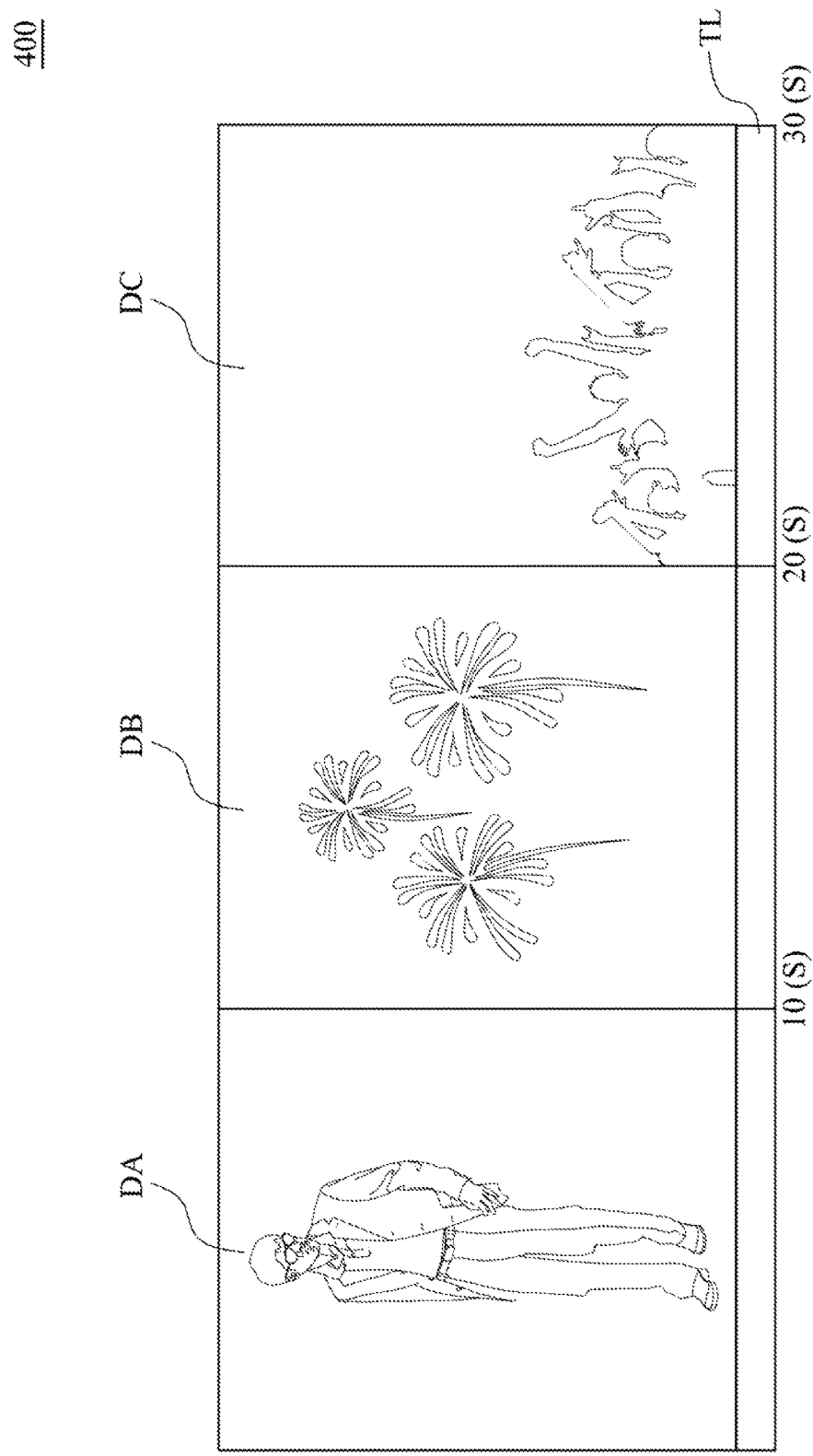
FIG. 4 is a schematic diagram of generating a normal video by the video generating method according to one embodiment of the present invention.

Referring to FIGS. 2A-2B and 3-4 FIGS. 2A-2B are flowcharts of a video generating method according to one embodiment of the present invention. FIG. 3 is a schematic diagram of a video generating method according to one embodiment of the present invention. FIG. 4 is a schematic diagram of generating a normal video by the video generating method according to one embodiment of the present invention. In one embodiment, the video generating method in FIG. 2A-2B is implemented by the system having a structure that is same as or similar to the structure shown in FIG. 1. To simplify the description below, in the following paragraphs, the embodiment shown in FIG. 1 will be used as an example to describe the video generating method shown in FIGS. 2A-2B according to the embodiment of the present disclosure. However, the present disclosure is not limited thereto.

The steps of the following video generating method may be added, replaced, and/or eliminated as appropriate, in accordance with various embodiments of the present disclosure.

In this embodiment, the video generating method shown in FIGS. 2A-2B includes the steps below.

In step S210, the camera device 110 obtains a 360-degree panoramic video. In one embodiment, the camera device 110 uses multiple lenses to capture a real video footage for generating a three-dimensional video. As shown in FIG. 3, the video generating system 100 obtains and records the images associated with areas F1~F4 to generate a 360-degree panoramic video. In another embodiment, the camera device 110 further obtains a 360-degree panoramic video with 360-degree panoramic sounds, which is received by the sound receiving device 120.

In step S220, the processor 130 determines a plurality of meaningful angles of the 360-degree panoramic video. The 360-degree panoramic video includes a plurality of frames, and each meaningful angle corresponds to a part of at least one frame of the 360 degrees panorama photography video. In one embodiment, the processor 130 determines the meaningful angles by detecting at least one object at least one face, at least one speaking person, or at least one sound direction from the part of at least one frame of the 360-degree panoramic video.

For example, the video generating system 100 in FIG. 3 obtains a 360-degree panoramic video of a concert. As shown in FIG. 3, the area F1 is the sky part of the 360-degree panoramic video, the area F2 is the floor part of the 360-degree panoramic video, the area F3 is the stage part including a stage of the 360-degree panoramic video, and the area F4 is the audiences part including audiences of the 360-degree panoramic video. According to this scenario, the meaningful angles can be determined by following methods. In addition, the following methods are not limited to this example. Also, the following methods can be used for other scenarios or other contents of the 360-degree panoramic video.

In one embodiment, the 360-degree panoramic video includes a plurality of frames. And, the processor 130 calculates a plurality of weighted parameters corresponding to a plurality of events, and the events occur in the different part of the at least one frame.

For example, the processor 130 firstly gives each kind of events a weighting as a weighted parameter. Next, the processor 130 finds out an event having the largest weighted parameter in a frame. And, the part of the frame corresponding to this event is determined as a meaningful angle. For instance, if the weighted parameter of a speaking person event is 3 the weighted parameter of showing up a specified object event is 4, and the weighted pa meter of showing up a recognized face event is 5, the processor 130 finds out that the recognized face event which has the largest weighted parameter in a frame. And then, the processor 130 determines that the part of the frame (e.g. the stage part F3 in FIG. 3) corresponds to the recognized face event (e.g. position A in FIG. 3) as the meaningful angle. In the embodiment, the kind of event in the 360-degree panoramic video is, but not limited thereto, a recognized face a speaking person, a specified object a sound, or a hot spot, etc.

In one embodiment, the weighted parameters are respectively as a weighted parameter of a face part of the at least one frame (e.g. an event of an audience face showing up in the area F4), a weighted parameter of a speaking person part of the at least one frame (e.g. an event of a host's face showing up in the area F3) and/or a weighted parameter of a sound direction) of the at least one frame (e.g. an event of receiving a sound of firecracker from the area F1). Next, the processor 130 finds out which one of the weighted parameters corresponding to these events having the largest value. Then, the processor 130 determines one of the meaningful angles according to a part of the at least one frame corresponded to the weighted parameters having the largest value. For example, the face part of one frame (e.g. an event of a singer's face showing up in the position A of the stage n FIG. 3) s determined as a meaningful angle if the processor 130 finds out that the weighted parameter of the face part of the one frame having the largest value in these weighted parameters.

In another embodiment the processor 130 defaults a previous popular angle to be one of the meaningful angles. The previous popular angle is a historical meaningful angle stored in the storage device 140. For example, most of audiences often view the stage part F3 during the concert. Audiences do not view the floor part F2 or sky part F1 too often during the concert. Thus, the viewing angle of the stage part F3 is determined as a hot spot, and configured as the historical meaningful angle and stored in the storage device 140. In this manner, the previous popular angle stored in the storage device 140 is determined to be one of the currently meaningful angles by the processor 130.)

In another embodiment, the processor 130 determines whether a recognized face is detected in the at least one frame of the 360-degree panoramic video to find the meaningful angles. If the recognized face is detected in the at least one frame of the 360-degree panoramic video, the processor 130 determines one of the meaningful angles corresponding to the frames having the recognized face in the at least one frame of the 360-degree panoramic video. For example, the processor 130 detects a singer's face in position A of FIG. 3. The processor 130 compares the singer's face with the stored facial information to determine whether the singer's face is same to or similar to the recognized face. If the processor 130 determines the singer's face is same to the recognized face, the singer's face is determined as the recognized face. Next, the processor 130 determines one of the meaningful angles corresponding to the recognized face for the at least one frame (e.g. position A in the at least one frame) of the 360-degree panoramic video.

In another embodiment, the processor 130 determines whether a speaking person is detected in the at least one frame of the 360-degree panoramic video to find the meaningful angles. If the voice source of person speaking is detected in the at least one frame of the 360-degree panoramic video, the processor 130 determines one of the meaningful angles corresponding to the person in the at least one frame of the 360-degree panoramic video. For example, if the processor 130 detects the voice source of the person speaking standing at position A, the processor 130 determines one of the meaningful angles corresponding to the person in the at least one frame (e.g. position A in the at least one frame) of the 360-degree panoramic video.

In another embodiment, the processor 130 further determines whether a sound source exists in the at least one frame of the 360-degree panoramic video to find the meaningful angles. If the sound source exists in the at least one frame of the 360-degree panoramic video, the processor 130 determines one of the meaningful angles corresponding to the associated with direction of the sound source in the at least one frame of the 360-degree panoramic idea. For example, if the processor 130 detects a sound source of a firecracker at position B, the processor 130 determines one of the meaningful angles corresponding to the part associated with the direction of the sound source in the at least one frame (e.g. position B in the at least one frame) of the 360-degree panoramic video.

The methods above-mentioned can be implemented separately. In other embodiment, the methods above-mentioned also can be combined to determine the meaningful angles. As shown in FIG. 2B, the priority of these steps is not limited thereto, and the order of the steps can be adjusted according to the practical use.

In one embodiment the step of S220 can further comprise following steps. The steps of the following steps may be added, replaced, and/or eliminated as appropriate, in accordance with various embodiments of the present disclosure.

In step S221a, the processor 130 determines whether a manual instruction is detected. If a manual instruction is not detected, the steps S223 S225, S227 are performed in parallel or any performing order. If a manual instruction is detected, the step S221b is performed. In step S221b the processor 130 determines the meaningful angle according to the manual instruction. For example, if a user inputs a manual instruction by clicking a part of the 360-degree panoramic video to choose a viewing angle to focus (S221a), the processor 130 determines the meaningful angle according to the manual instruction (S221b). And then, step S230 is performed.

In step S223a, the processor 130 determines one of the meaningful angles corresponding to the part of recognized face in the at least one frame, in the case of a recognized face is detected. In one embodiment, if a recognized face is not detected in the at least one frame of the 360-degree panoramic video, the weighted parameter of the recognized face event can be set as null or zero. If a recognized face is detected in the at least one frame of the 360-degree panoramic video, the step S229 is performed.

In step S225, the processor 130 determines one of the meaningful angles corresponding to the part of voice source of person speaking in the at least one frame, in the case of voice source of person speaking is detected. In one embodiment, if voice source of person speaking is not detected in the at least one frame of the 360-degree panoramic video, the weighted parameter of the voice source of person speaking event can be set as null or zero. If the voice source of person speaking is detected in the at least one frame of the 360-degree panoramic video, the step S229 is performed.

In step S227, the processor 130 determines one of the meaningful angles corresponding to the part of the sound source in the at least one frame, in the case of a sound source exists. In one embodiment, if a sound source is not detected in the at least one frame of the 360-degree panoramic video, the weighted parameter of sound source event can be set as null or zero. If a sound source is detected in the at least one frame of the 360-degree panoramic video the step S229 is performed.

In step S229 the processor 130 selects one of the meaningful angles according to a part of the at least one frame corresponded to the weighted parameters having the largest value.

The detail and examples for the steps in FIG. 2B are the same as the aforementioned embodiment, and detailed descriptions thereof will be omitted. As such, the video generating method can determine the meaningful angles according to the different events.

Next, in step S230, the processor 130 separates the 360-degree panoramic video into a plurality of durations having the at least one frame according to the meaningful angles, wherein each duration corresponds to one of the meaningful angles.

In one embodiment, the 360-degree panoramic video is a 30 seconds video. Firstly, a singer at position A in FIG. 3 shows up in the frames associated within 0-10 seconds of the 360-degree panoramic video. Next, a firecracker at position B in FIG. 3 shots off in the frames associated within 11-21 seconds of the 360-degree panoramic video. Last, the audiences at position C in FIG. 3 cheer and shout in the frames associated within 21-30 seconds of the 360-degree panoramic video. In this embodiment, the meaningful angles determined in step S220 are position A, position B, and position C as shown in FIG. 3. That is, the position A of the meaningful angle corresponds to the 0-10 seconds of the 360-degree panoramic video. The position B of the meaningful angle corresponds to the 11-20 seconds of the 360-degree panoramic video. The position C of the meaningful angle corresponds to the 21-30 seconds of the 360-degree panoramic video. As shown in FIG. 4, the processor 130 separates the 360-degree panoramic video as the durations DA (0-10 seconds), DB (11-20 seconds) and DC (21-30 seconds) according to each meaningful angle (e.g. the position A, the position B, and the position C). In another words, each duration DA, DB and DC corresponds to one of the meaningful angles.

In step S240, the processor 130 generates a normal video 400 according to the durations DA, DB, and DC. For example, the normal video 400 includes the durations DA (0-10 seconds), DB (11-20 seconds) and DC (21-30 seconds shown in FIG. 4 according to the meaningful angles (e.g. the position A, position B, and position C) as shown in FIG. 3. The time line TL is presented as the total time of the normal video 400. In this way, the normal video 400 is generated by meaningful angles of the original 360-degree panoramic video. As such, the normal video 400 is realized as a part of the original 360-degree panoramic video. Further, the data format of the normal video 400 can be implemented by MP4, MPEG, AVI, WMA or other general formats without using a particular video player to play. In addition, the normal video 400 can be generated as a fixed resolution video, such as 800*600 or 1024*768 pixels.

Through the steps above-mentioned, the processor 130 determines the meaningful angles of 360-degree panoramic video. The meaningful angles are the special moment or the representative part of the 360-degree panoramic video. Then, the processor 130 generates the normal video according to the durations corresponding to the meaningful angles. In this manner, the normal video may still contain the representative part of the original 360-degree panoramic video. In addition, the video generating system 100 provides the function for viewing the normal video without a particular or special video player. The normal video is easily to transmit or display.

Figure 5:
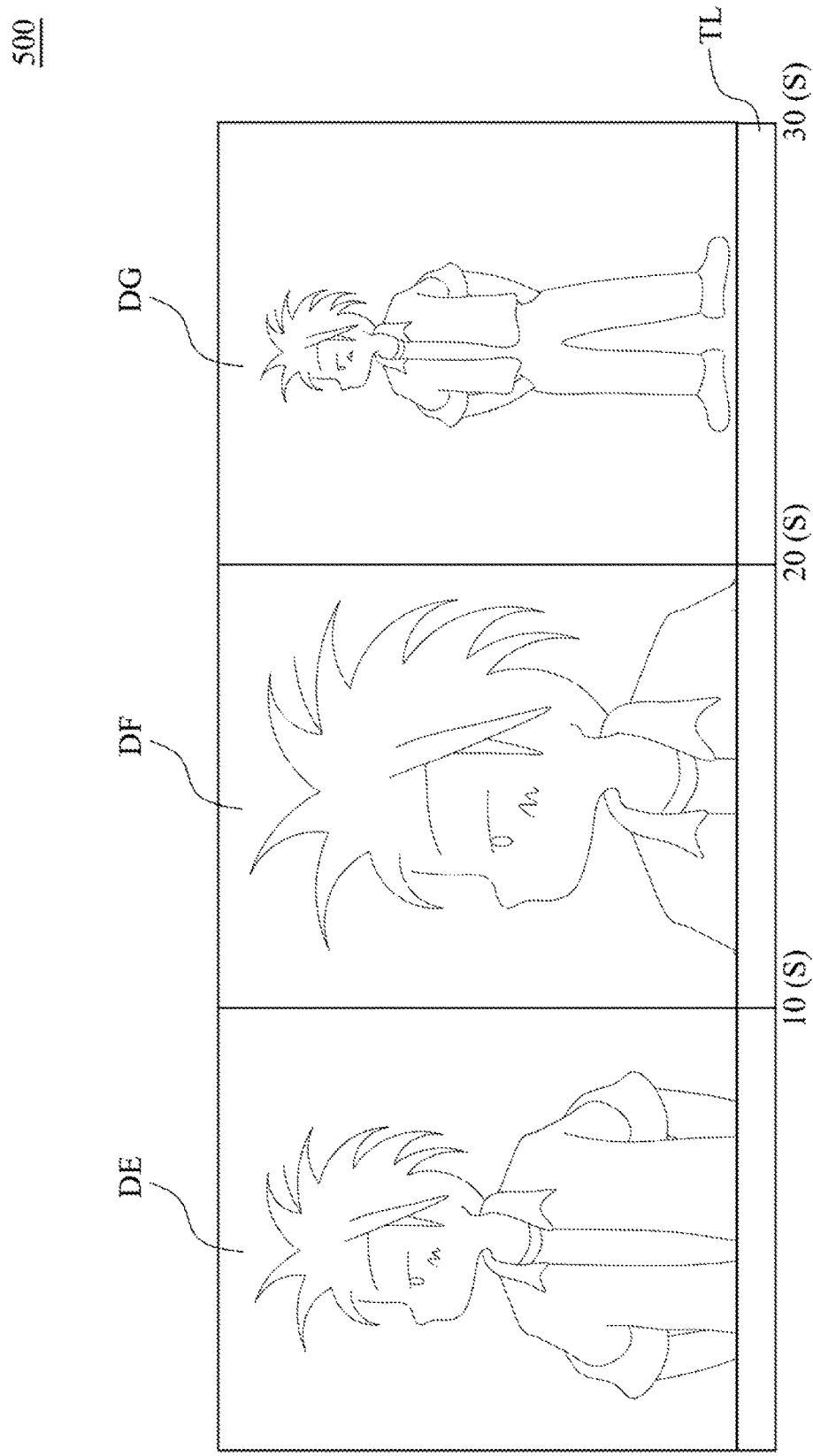
FIG. 5 is a schematic diagram of generating a normal video by the video generating method according to one embodiment of the present invention.

In another aspect, the video generating system 100 can further zooms in or zooms out a part of frames. Please see the FIG. 5 FIG. 5 is a schematic diagram of a normal video generating by the video generating method according to one embodiment of the present invention.

In one embodiment, the processor 130 zooms in the part of the at least one frame when a resolution of the at least one frame is higher than a resolution threshold and the durations corresponds to the same meaningful angles are longer than a time threshold. For example, the meaningful angles determined in step S220 are the same meaningful angles, or only one meaningful angel (e.g. a speech content or a performance content of a 360-degree panoramic video) is determined in step S220. In this situation, the viewer may feel bored when the normal video 500 is generated by the same meaningful angles, such as durations DE, DF and DG. The durations DE, DF and DG have the same meaningful angles and show up the same person. To avoid generating a boring normal video, the meaningful angles correspond to durations DE, DF and DG can be zoomed in or zoomed out to make the normal video 500 more vivid. For example, a half body of a man is in the duration DE of the normal video 500. If the resolution of the frames of the duration DF is higher than a resolution threshold and these three durations DE, DF and DG corresponds to the same meaningful angles are longer than a time threshold, the at least one frame of the duration DF can be zoomed in. It means the meaningful angles are the same and remaining for a while, and the resolution of the frames is determined as a suitable condition to zoom in. In this way, the duration DF can show the details of the man's head. Due to the higher resolution, it will not be blurred when the frame is zoomed in. Further, the processor 130 zooms out the part of the at least one frame when the resolution of the at least one frame is lower then a resolution threshold. For example, when the resolution of the frames is lower than a resolution threshold in the duration DG, the processor 130 zooms out the frames of the duration DG to avoid the blurring situation of the fames. After zooming out the frames in duration DG, the whole body of the man is shown in the normal video 500.

As such, even all the durations DE, DF and DG corresponding to the same meaningful angles, the normal video can be vivid by the zoom in and zoom out effects. The viewer will have more patients when the normal video 500 contains some visual changes.

Figure 6:
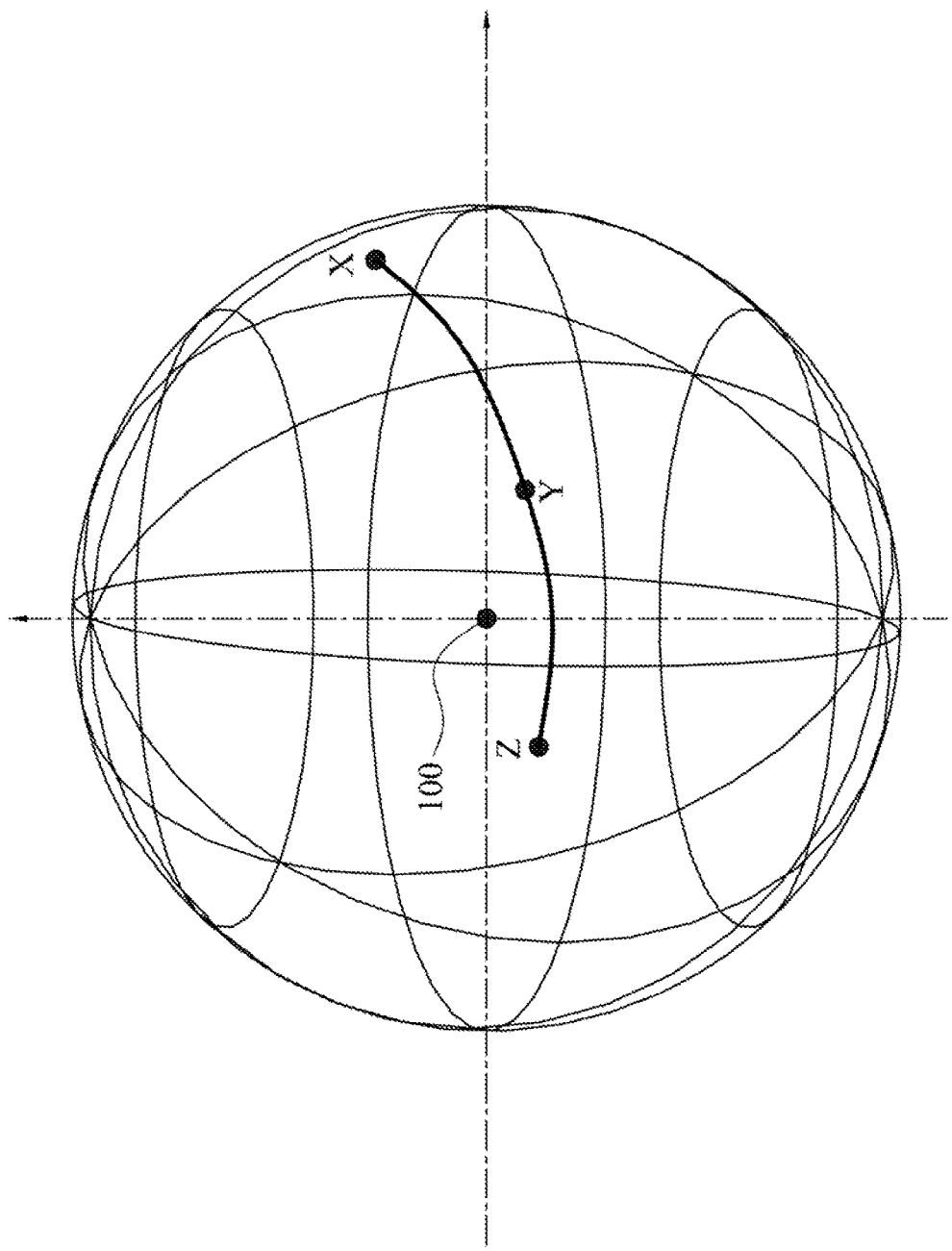
FIG. 6 is a schematic diagram of a video generating method according to one embodiment of the present invention.
Figure 7:
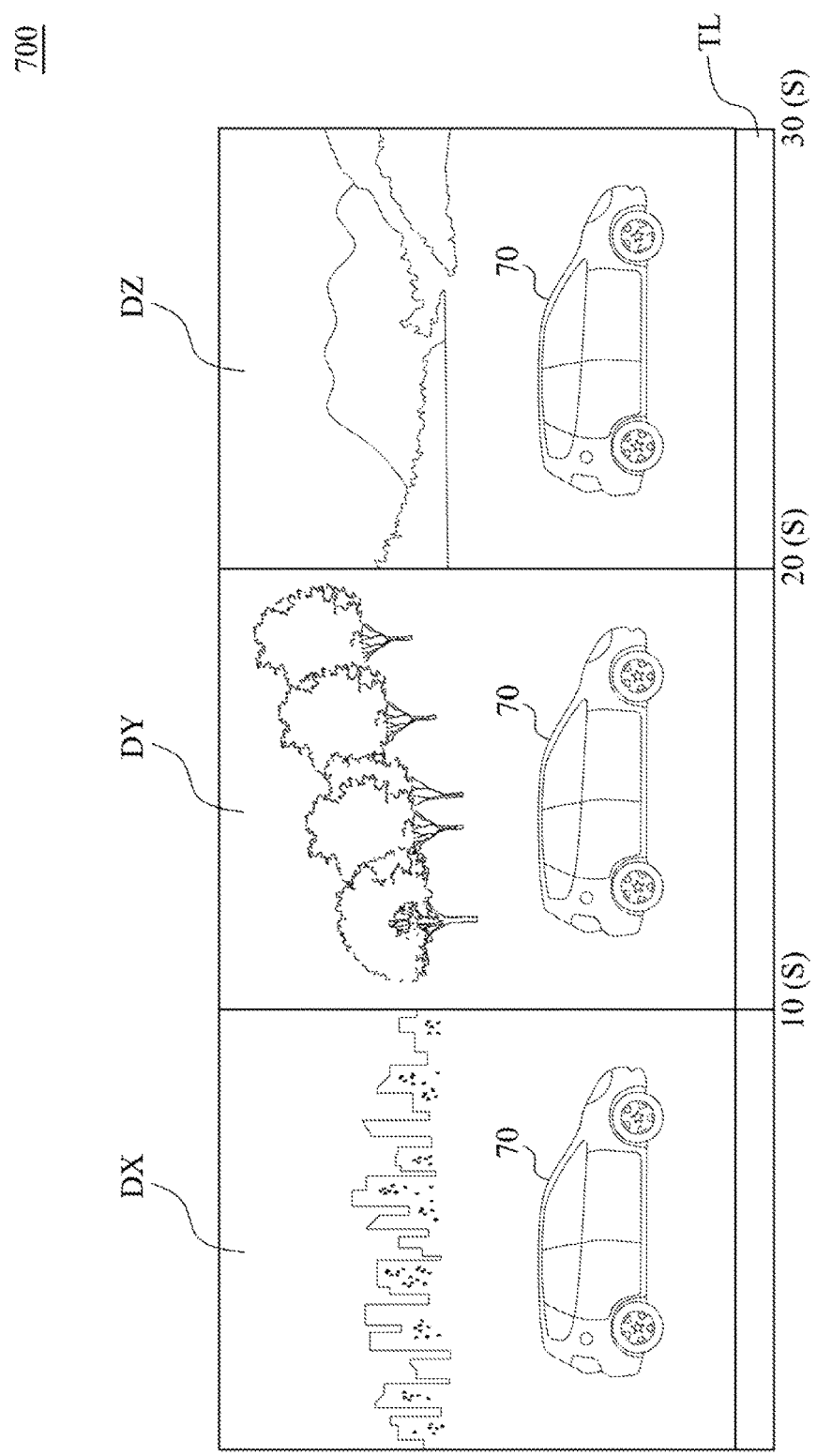
FIG. 7 is a schematic diagram of generating a normal video by the video generating method according to one embodiment of the present invention.

In one embodiment, the processor 130 is configured to automatically trace the at least one object, the at least one face, the at least one speaking person, or the at least one sound directions which is corresponded to one of the meaningful angles. Please see FIGS. 6-7 as an example, FIG. 6 is a schematic diagram of a video generating method according to one embodiment of the present invention. FIG. 7 is a schematic diagram of a normal video generating by the video generating method according to one embodiment of the present invention.

For example, the video generating system 100 captures an object corresponding to one of the meaningful angles in 360-degree panoramic video. In one embodiment, the 360-degree panoramic video contains a car 70 moving from the position X to the position Y and then moving from the position Y to the position Z. The processor 130 is configured to automatically trace the car 70 by recognizing the position of the car 70 in 360-degree panoramic video, such as positions X, Y and Z, as shown in FIG. 6. In this embodiment, the meaningful angles are determined according to positions of the car 70. For instance, when the car 70 is at position X the meaningful angles is determined as position X and the processor 130 is configured to automatically trace the car 70 for generating the content of the duration DX. When the car 70 is at position Y, the meaningful angles is determined as position Y and the processor 130 is configured to automatically trace the car 70 for generating the content of the duration DY. When the car 70 is at position Z, the meaningful angles is determined as position Z and the processor 130 is configured to automatically trace the car 70 for generating the content of the duration DZ. In another embodiment, the 360-degree panoramic video can be separated into more durations corresponding to the position of car 70 to obtain the tracing effect smoothly.

Next, the video generating system 100 generates a normal video 700 which contains the car 70 in the all durations DX, DY and DZ. On the other hand, the other detailed technological features of components, steps and applications of FIGS. 6-7 are the same as those of the aforementioned embodiment, and detailed descriptions thereof will be omitted.

Accordingly, by the method above described, the object, the person or/and the sound can be traced by the processor 130. And, a normal video 700 can be generated according to the traced object, the person or/and the sound. In this way, it is helpful for the viewer to focus on the specific event.

It should be noted that, the video generating methods above mentioned can be implemented by video generating system 100 in the embodiment described above, or can be implemented as a computer program stored in a non-transitory computer readable medium to be read for controlling a computer or an electronic devices to execute the video generating methods above mentioned in FIGS. 2A-2B. The computer program can be stored in a non-transitory computer readable medium such as a ROM (read-only memory), a flash memory, a floppy disc, a hard disc, an optical disc, a flash disc, a tape, an database accessible from a network, or any storage medium with the same functionality that can be contemplated by persons of ordinary skill in the art to which this invention pertains.

The video generating method and system thereof can produce a normal video from 360-degree panoramic video. In addition, the normal video is composed by several viewing angles, which are meaningful for those composed duration. Viewer can still watch the meaningful contents by the normal video, and the normal video is easier to transmit or to display without a specific software player. However, the present disclosure is not limited in this regard, another communication technology is within the contemplate scope of the present disclosure.

Although the present invention has been described in considerable detail with reference to certain embodiments thereof, other embodiments are possible. Therefore, the scope of the appended claims should not be limited to the description of the embodiments contained herein.

What is claimed is:
1. A video generating system, comprising:
a processor operatively configured to:
determine a plurality of target angles of a 360-degree panoramic video based on at least one object, at least one face, at least one speaking person, or at least one sound direction being detected from a part of at least one frame of the 360-degree panoramic video;
separate the 360-degree panoramic video into a plurality of durations according to the target angles, wherein each duration corresponds to one of the target angles;
generate a normal video according to the durations associated with the target angles;
zoom in the part of the at least one frame in response to a resolution of the at least one frame being higher than a resolution threshold and the durations corresponding to the same target angles are longer than a time threshold; and zoom out the part of the at least one frame in response to the resolution of the at least one frame being lower than a resolution threshold.

2. The video generating system of claim 1, further comprising:
a camera device operatively configured to capture the 360-degree panoramic video;
wherein each target angle corresponds to the part of the at least one frame of the 360-degree panorama video.

3. The video generating system of claim 2, wherein the processor further is operatively configured to:
automatically trace the at least one object, the at least one face, the at least one speaking person, or the at least one sound directions which is corresponded to one of the target angles.

4. The video generating system of claim 1, wherein the processor further is operatively configured to:
determine a plurality of weighted parameters corresponding to a plurality of events; and
calculate one of the target angles according to the weighted parameters;
wherein the events occur in different part of the at least one frame of each duration.

5. The video generating system of claim 4, wherein the processor calculates one of the target angles according to a largest one of the weighted parameters.

6. The video generating system of claim 1, further comprising:
a storage device operatively configured to store a previous popular angle;
wherein the previous popular angle is determined to be one of the target angles by the processor.

7. The video generating system of claim 1, wherein the processor further is operatively configured to:
determine whether a recognized face is detected in the at least one frame of the 360-degree panoramic video;
wherein in response to that the recognized face is detected in the at least one frame of the 360-degree panoramic video, the processor determines one of the target angles corresponding to the recognized face in the at least one frame of the 360-degree panoramic video.

8. The video generating system of claim 1, further comprising:
a sound receiving device operatively configured to receive a sound source;
wherein the processor further determines whether the sound source exists in the at least one frame of the 360-degree panoramic video;
in response to that the sound source exists in the at least one frame of the 360-degree panoramic video, the processor determines one of the target angles corresponding to the sound source in the at least one frame of the 360-degree panoramic video.

9. A video generating method, comprising:
determining a plurality of target angles of a 360-degree panoramic video based on at least one object, at least one face, at least one speaking person, or at least one sound direction being detected from a part of at least one frame of the 360-degree panoramic video;
separating the 360-degree panoramic video into a plurality of durations according to the target angles, wherein each duration corresponds to one of the target angles;
generating a normal video according to the durations associated with the target angles;

zooming in the part of the at least one frame in response to a resolution of the at least one frame being higher than a resolution threshold and the durations corresponding to the same target angles are longer than a time threshold; and
zooming out the part of the at least one frame in response to the resolution of the at least one frame being lower than a resolution threshold.

10. The video generating method of claim 9, wherein each target angle corresponds to the part of the at least one frame of the 360-degree panorama video.

11. The video generating method of claim 10, further comprising:
automatically tracing the at least one object, the at least one face, the at least one speaking person, or the at least one sound directions which is corresponded to one of the target angles.

12. The video generating method of claim 11, further comprising:
determine a plurality of weighted parameters, wherein the weighted parameters corresponding to a plurality of events; and
calculating one of the target angles according to the weighted parameters;
wherein the events occur in different part of the at least one frame of each duration.

13. The video generating method of claim 11, further comprising:
determining a previous popular angle stored in a storage device to be one of the target angles.

14. The video generating method of claim 11, further comprising:
determining whether a recognized face is detected in the at least one frame of the 360-degree panoramic video;
wherein in response to that the recognized face is detected in the at least one frame of the 360-degree panoramic video, a processor determines one of the target angles corresponding to the recognized face in the at least one frame of the 360-degree panoramic video.

15. The video generating method of claim 11, further comprising:
determining whether a speaking person is detected in the at least one frame of the 360-degree panoramic video;
wherein in response to that the speaking person is detected in the at least one frame of the 360-degree panoramic video, a processor determines one of the target angles corresponding to the part of speaking person in the at least one frame of the 360-degree panoramic video.

16. The video generating method of claim 11, further comprising:
determining whether a sound source exists in the at least one frame of the 360-degree panoramic video;
wherein in response to that the sound source exists in the at least one frame of the 360-degree panoramic video, a processor determines one of the target angles corresponding to the sound source in the at least one frame of the 360-degree panoramic video.

* * * * *